(12) United States Patent
Noda et al.

(10) Patent No.: US 7,912,335 B2
(45) Date of Patent: Mar. 22, 2011

(54) TWO-DIMENSIONAL PHOTONIC CRYSTAL AND OPTICAL DEVICE USING THE SAME

(75) Inventors: Susumu Noda, Kyoto (JP); Takashi Asano, Kyoto (JP); Seiichi Takayama, Chuo-ku (JP)

(73) Assignees: Kyoto University, Kyoto-Shi (JP); TDK Corporation, Tokyo (JP)

( * ) Notice: Subject to any disclaimer, the term of this patent is extended or adjusted under 35 U.S.C. 154(b) by 0 days.

(21) Appl. No.: 11/794,192

(22) PCT Filed: Dec. 28, 2005

(86) PCT No.: PCT/JP2005/024066
§ 371 (c)(1),
(2), (4) Date: Aug. 8, 2007

(87) PCT Pub. No.: WO2006/070867
PCT Pub. Date: Jul. 6, 2006

(65) Prior Publication Data
US 2008/0124037 A1  May 29, 2008

(30) Foreign Application Priority Data
Dec. 28, 2004 (JP) .................................. 2004-378706

(51) Int. Cl.
*G02B 6/10* (2006.01)
(52) U.S. Cl. ...................................................... 385/129
(58) Field of Classification Search .................... 385/129
See application file for complete search history.

(56) References Cited

U.S. PATENT DOCUMENTS

| | | | |
|---|---|---|---|
| 6,101,300 A | 8/2000 | Fan et al. | |
| 6,130,969 A | 10/2000 | Villeneuve et al. | |
| 6,512,866 B1 | 1/2003 | Fan et al. | |
| 6,738,551 B2 | 5/2004 | Noda et al. | |
| 2002/0009277 A1 | 1/2002 | Noda et al. | |
| 2002/0150366 A1 | 10/2002 | Loncar et al. | |
| 2004/0184735 A1 | 9/2004 | Noda et al. | |
| 2005/0002605 A1* | 1/2005 | Sakai et al. | 385/27 |
| 2006/0098918 A1 | 5/2006 | Noda et al. | |
| 2007/0280592 A1* | 12/2007 | Furuya et al. | 385/27 |

FOREIGN PATENT DOCUMENTS

JP   A 2001-508887   7/2001

(Continued)

*Primary Examiner* — Uyen-Chau N Le
*Assistant Examiner* — Kajli Prince
(74) *Attorney, Agent, or Firm* — Oliff & Berridge, PLC (57) ABSTRACT

An object of the present invention is to provide a two-dimensional photonic crystal in which conditions for both the TE-polarized light and the TM-polarized light can be easily satisfied. A body includes a first area having a triangular lattice pattern arrangement of a circular hole and a second area having a triangular lattice pattern arrangement of an equilateral triangular holes. Therefore, the TE-PBG which is a photonic band gap (PBG) for the TE-polarized light is created in the first area, and the TM-PBG which is a PBG for the TM-polarized light is created in the second area. Parameters such as the period and size of the holes can be independently set for the first area and the second area, so that an energy region common to the TE-PBG and the TM-PBG (i.e. absolute PBG) can be made larger and easily created. Forming a waveguide and resonators and or the like corresponding to an energy within the absolute PBG allows formation of a polarized light multiplexer/demultiplexer and a frequency (wavelength) multiplexer/demultiplexer without depending on polarized light or the like.

7 Claims, 5 Drawing Sheets

FOREIGN PATENT DOCUMENTS

| | | |
|---|---|---|
| JP | A 2001-272555 | 10/2001 |
| JP | A 2004-212416 | 7/2004 |
| JP | A 2004-279791 | 10/2004 |
| JP | A 2004-294517 | 10/2004 |
| JP | A 2004-334190 | 11/2004 |
| JP | A 2005-250202 | 9/2005 |

* cited by examiner

FIRST AREA    SECOND AREA

(a) COMPARATIVE EXAMPLE
(b) PRESENT EMBODIMENT
(c) COMPARATIVE EXAMPLE (CU)
(d) PRESENT EMBODIMENT (CU)

TWO-DIMENSIONAL PHOTONIC CRYSTAL AND OPTICAL DEVICE USING THE SAME

TECHNICAL FIELD

The present invention relates to a two-dimensional photonic crystal used for optical devices such as an optical multiplexer/demultiplexer. It should be noted that the term "light" or "optical" used in this patent application includes electromagnetic waves in general as well as visible light.

BACKGROUND ART

Since optical communication is a technique that could play a central role in future broadband communications, the optical components used in optical communication systems are required to be higher in performance, smaller in size, and lower in price for widespread use of the optical communication. Optical communication devices using photonic crystals are one of the leading candidates for the next-generation optical communication components that satisfy the above-described requirements. Some of the optical communication devices have already been put into practical use, and an example is a photonic crystal fiber for polarized light dispersion compensation. Furthermore, recent efforts have had a practical goal of developing optical multiplexers/demultiplexers and other devices that can be used in wavelength division multiplexing (WDM) communication.

A photonic crystal is a dielectric object having a period structure. Usually, the period structure is created by providing the dielectric body with a periodic arrangement of modified refractive index areas, i.e. the areas whose refractive index differs from that of the body. Within the crystal, the period structure creates a band structure with respect to the energy of light and thereby produces an energy region in which the light cannot be propagated. Such an energy region is called the "photonic band gap (PBG)".

Providing an appropriate defect in the photonic crystal creates a specific energy level ("defect level") within the PBG and only a ray of light having a wavelength corresponding to the defect level is allowed to be present in the vicinity of the defect. A defect created in a point pattern can function as an optical resonator that resonates with light having a specific wavelength, and a linear defect enables the crystal to be used as a waveguide.

As an example of the above-described technique, Patent Document 1 discloses a two-dimensional photonic crystal having a body (or slab) provided with a periodic arrangement of modified refractive index areas, in which a linear defect of the periodic arrangement is created to form a waveguide and a point-like defect is created adjacent to the waveguide. This two-dimensional photonic crystal functions as the following two devices: a demultiplexer for extracting a ray of light whose wavelength equals the resonance wavelength of the resonator from rays of light having various wavelengths and propagated through the waveguide and for sending the extracted light to the outside; and a multiplexer for introducing the same light from the outside into the waveguide.

Many two-dimensional photonic crystals including the one described in Patent Document 1 are designed so that the PBG becomes effective for either a TE-polarized light, in which the electric field oscillates in the direction parallel to the body, or a TM-polarized light, in which the magnetic field oscillates in the direction parallel to the body. In this case, if the PBG is not created for the other polarized light or created in an energy region which differs from that of the PBG of the given polarized light, the TE-polarized light and the TM-polarized light cannot be simultaneously used in the same frequency, wavelength and energy.

For example, if it is further made possible to use the TE-polarized light and the TM-polarized light independently with respect to the same frequency in the WDM, the multiplexing number can be doubled in comparison with the case without using the polarized light independently (polarized light multiplexing). However, individual use of both the TM-polarized light and the TM-polarized light in the same frequency is impossible in an optical multiplexer/demultiplexer using the conventional two-dimensional photonic crystal, so that polarized light multiplexing is difficult to perform.

Taking the above problem into account, studies have been conducted on a new design of a two-dimensional photonic crystal having a PBG for each of the TE-polarized light and the TM-polarized light in which the two PBGs have a common band. This common band is called the "absolute photonic band gap (absolute PBG)" hereinafter. For example, a two-dimensional photonic crystal disclosed in Patent Document 2 has an absolute PBG created by periodically arranging triangular (or triangle-pole-shaped) holes in a triangular lattice pattern in a slab-shaped body. In this two-dimensional photonic crystal described in Patent Document 2, light whose frequency is within the absolute PBG can be used as the TE-polarized light and the TM-polarized light independently.

[Patent Document 1] Unexamined Japanese Patent Publication No. 2001-272555 ([0023]-[0027.], [0032], FIGS. 1, and 5-6)

[Patent Document 2] Unexamined Japanese Patent Publication No. 2004-294517 ([0021]-[0022.], [0041]-[0043], FIGS. 1, and 14-17)

DISCLOSURE OF THE INVENTION

Problem to be Solved by the Invention

A point-like defect (i.e. resonator) used for extracting/introducing the TE-polarized light from/into a waveguide and a point-like defect used for extracting/introducing the TM-polarized light from/into the waveguide are provided in the vicinity of a waveguide, in which both resonance frequencies need to be consistent, in order to create a polarized light multiplexing optical multiplexer/demultiplexer. For the polarized light multiplexing optical multiplexer/demultiplexer, an appropriate adjustment is required for parameters such as the period (i.e. lattice constant), size and shape of modified refractive index areas, the body thickness, and the refractive index of a body and modified refractive index areas. However, if parameters are set to optimize conditions for one of the polarized light, conditions for the other polarized light are also changed. It is therefore difficult to provide a design that satisfies conditions for both of the polarized light.

Figure 1:
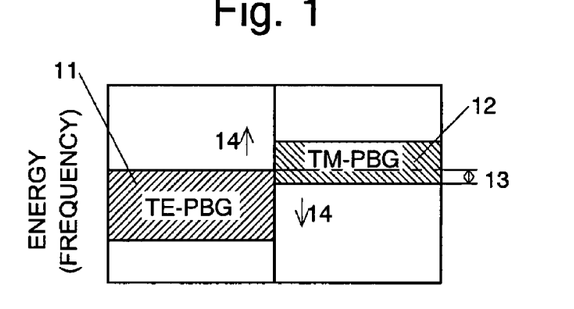
FIG. 1 is a model diagram of a PBG in a conventional two-dimensional photonic crystal.

For example, though the absolute PBG is created in the two-dimensional photonic crystal disclosed in Patent Document 2, a common energy region 13 which is common to a PBG for the TE-polarized light (TE-PBG 11) and a PBG for the TM-polarized light (TM-PBG 12) is created in only a part of an energy region of each of the PBGs as shown in FIG. 1. If it is assumed that an energy region of either the TE-PBG or the TM-PBG can be shifted as shown by an arrow 14, an energy width of the common energy region 13 can be increased, but changing the above-described parameters to shift an energy region of one of the PBGs causes an energy region of the other PBG to be shifted in practice.

Such a problem is not limited to the above-described polarized light multiplexing optical multiplexer/demultiplexer but commonly observed in optical devices, such as a polarized light separating element and polarized light dispersion compensator, in which a photonic crystal using the difference of the TE-polarized light and the TM-polarized light is employed. A problem similar to the above-described problem is also observed in the case where light having a specific wavelength is multiplexed/demultiplexed without depending on the difference of polarized light, other than the case where the difference of the TE-polarized light and the TM-polarized light is used.

For the problem to be solved by the present invention, a two-dimensional photonic crystal and an optical device using the crystal are provided, in which conditions can be easily satisfied for both the TE-polarized light and the TM-polarized light.

Means for Solving the Problem

A two-dimensional photonic crystal according to the present invention, which was achieved to solve the above-described problem, has a slab-shaped body provided with a periodic arrangement of refractive index distribution, and is characterized it comprises:

a) a first area having a photonic band gap for the TE-polarized light; and b) a second area disposed adjacent to the first area and having a photonic band gap for the TM-polarized light, in which at least a part of an energy region is common to the above-described photonic band gap of the TE-polarized light.

In the two-dimensional photonic crystal according to the present invention, a refractive index distribution in the first area is realized by an arrangement of circular modified refractive index areas in a triangular lattice pattern, and a refractive index distribution in the second area is realized by an arrangement of equilateral triangular modified refractive index areas in a triangular lattice pattern.

The two-dimensional photonic crystal according to the present invention can be further provided with a waveguide, which passes through both the first area and the second area.

The two-dimensional photonic crystal provided with the above-described waveguide according to the present invention can be further provided with a resonator in the vicinity of the waveguide in each of the first area and the second area in order to cause the polarized light corresponding to the areas, i.e. the polarized light having a photonic band gap formed in the area, to resonate.

The two-dimensional photonic crystal provided with the above-described waveguide and resonators according to the present invention can be further provided with a second waveguide passing through either the first area or the second area and created to interpose the resonator in the given one area with the above-described waveguide.

The two-dimensional photonic crystal provided with the above-described waveguide and resonators according to the present invention can be further provided with a second waveguide passing through both the first area and the second area and created to interpose the resonators in the both areas with above-described waveguide.

The two-dimensional photonic crystal provided with the above-described waveguide according to the present invention functions as a single construction unit, and a plurality of the construction units can be connected to create a two-dimensional photonic crystal in which the waveguides in the entire construction units are continuously connected.

The two-dimensional photonic crystal according to the present invention should desirably have the body thickness which is consistent in the entire areas.

The two-dimensional photonic crystal according to the present invention can be used to construct optical function elements such as a wavelength multiplexer/demultiplexer, polarized light separating element, and polarized light dispersion compensator.

EXPLANATION OF NUMERALS 11, 41 . . . TE-PBG
12, 42 . . . TM-PBG
13 . . . Common energy region
20 . . . Body
21 . . . First area
22 . . . Second area
23 . . . Circular hole
24 . . . Equilateral triangular hole
25, 28, 29, 30, 53, 58, 59 . . . Waveguide
26, 27, 54, 55, 56, 57 . . . Resonator
31 . . . Absolute PBG
43 . . . TE-WG
44 . . . TM-WG
50 . . . Reflector
51 . . . Third area
52 . . . Fourth area

MODES FOR CARRYING OUT THE INVENTION AND THEIR EFFECTS

A two-dimensional photonic crystal according to the present invention includes a first area having a TE-PBG and a second area having a TM-PBG, to be created within a single two-dimensional photonic crystal. A two-dimensional photonic crystal which is similar to that of the conventional technique having the TM-PBG can be used in the first area, and a two-dimensional photonic crystal similar to that of the conventional technique having the TM-PBG can be used in the second area.

In order to allow the TE-polarized light and the TM-polarized light in the same frequency to be both used in the two-dimensional photonic crystal, parameters such as the period, size and shape of modified refractive index areas, the body thickness, and the refractive index of a body and modified refractive index areas are set in the first area and the second area so that a common energy region (i.e. frequency region and wavelength region) is shared by the PBG of the first area and the PBG of the second area. Since parameters can be independently set for the first area and the second area according to the present invention, a common energy region can be created easily and wider than that of the conventional technique.

Figure 2:
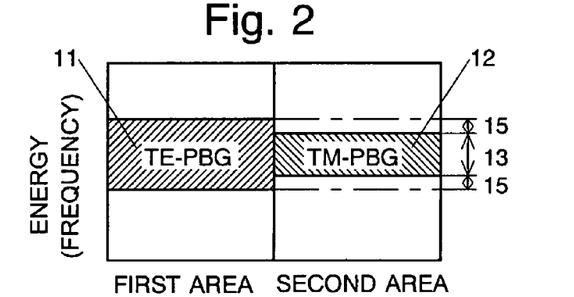
FIG. 2 is a model diagram of a PBG in a two-dimensional photonic crystal according to the present invention.

For example, one of the PBGs (PBG of the second area in FIG. 2) can be made to be entirely included in an energy region of the other PBG as shown in FIG. 2. In this case, an entire energy region of the one PBG becomes a common energy region 13.

The TM-PBG may be further created in the first area as long as the TE-PBG is created, and similarly the TE-PBG may be further created in the second region as long as the TM-PBG is created. However, even if the TE-PBG and the TM-PBG are created in one of the areas, using the TE-PBG in the first area and using the TM-PBG in the second area are more desirable than using both the TE-PBG and TM-PBG in each of these areas due to an advantage of allowing expansion of the common energy region and easy setting of optimum conditions for each polarized light.

The first area can be created by arranging a triangular lattice pattern of circular modified refractive index areas in a body, as described in Patent Document 1 for example. The second area can be created by arranging the triangular lattice pattern of triangular modified refractive index areas in the body, as described in Patent Document 2 for example. Of course, the first area and the second area can be created by any other constructions.

It is generally advantageous to create the first area and the second area in one slab-shaped body from an aspect of manufacturing, so that the first area and the second area should be desirably equal in the body thickness and refractive index among the above-described parameters. In this case, the first area and the second area are created by appropriately setting the period, size and shape of the modified refractive index areas.

Although the modified refractive index areas can be created by embedding a substance whose refractive index differs from that of the body into the body, creating the modified refractive index areas by arranging holes in the body is easier in manufacturing and desirable in that a refractive index difference can be increased with respect to the body.

The two-dimensional photonic crystal having the first area and the second area thus created can be used as, for example, a photonic crystal mirror for reflecting both the TE-polarized light and TM-polarized light having a frequency within a frequency region corresponding to the common energy region. Furthermore, a waveguide and a resonator can be provided in the two-dimensional photonic crystal as described below, in order to apply the two-dimensional photonic crystal of the present invention to various optical function elements.

The two-dimensional photonic crystal, in which the first area and the second area are created, can be provided with a waveguide passing through the first area and the second area. This waveguide can be formed by arranging a defect of period refractive index distribution along a straight line, in the same manner with the conventional two-dimensional photonic crystal. Moreover, a frequency band which allows light to pass through the waveguide (i.e. passing frequency band) can be appropriately set by adjusting the width of the waveguide and parameters of the modified refractive index areas or the like. In this case, parameters can also be set independently for the first area and the second area, so that a waveguide having a predetermined passing frequency band can be easily formed.

Since a waveguide having a predetermined passing frequency band can be easily formed as described above, an optical function element to be manufactured as follows for example. A waveguide is formed so that a defect level in the same frequency is set within the PBG in the first area with respect to the TE-polarized light and in the second area with respect to the TM-polarized light. Then, parameters are set in the first area so as to include the frequency in a TM-photonic band (not PBG) which is a waveguide band of the TM-polarized light. Meanwhile, the frequency is made to be included in the TE-PBG in the second area. The PBG can also be created for not only the TM-polarized light but also the TE-polarized light on condition that triangular modified refractive index areas are arranged in a triangular lattice pattern. According to this construction, when the TE-polarized light and the TM-polarized light having the above-described frequency are introduced into the waveguide of the first area, both the TE-polarized light and the TM-polarized light can be propagated in the waveguide of the first area, whereas only the TM-polarized light can be propagated in the waveguide of the second area without allowing propagation of the TE-polarized light because the above-described frequency is present within the TE-PBG. Accordingly, the TE-polarized light of the above-described frequency is reflected in the boundary between the first are and the second area, while the TM-polarized light having the same frequency is contrarily allowed to pass through the boundary, so that the TE-polarized light and the TM-polarized light can be separated in the same frequency.

The two-dimensional photonic crystal according to the present invention can be further provided with a resonator. This resonator can be created by a point-like defect which is obtained by creating a defect of modified refractive index areas in a point pattern. The point-like defect can be created by changing the path and shape of the modified refractive index areas in a position to create the defect, or embedding the modified refractive index areas or omitting the modified refractive index areas. The point-like defect includes a simple point defect composed of only a single modified refractive index area, and a cluster-type defect composed of a plurality of neighboring modified refractive index areas. The point-like defect thus created forms a defect level within the PBG, in which light of a frequency corresponding to the defect level resonates in the point-like defect. An energy value of the defect level, i.e. a resonance frequency, is determined by parameters such as the position, shape and size of the point-like defect and the period of the modified refractive index areas. Appropriately setting these parameters allows the first area to have a resonator in which the TE-polarized light of a desired frequency resonates, and the second region to have a resonator in which the TM-polarized light of a desired frequency resonates. Details of these resonators are described in Patent Documents 1 and 2. In the two-dimensional photonic crystal according to the present invention, resonators can be independently designed without influencing from each other in the first area and the second area disposed within one two-dimensional photonic crystal.

The two-dimensional photonic crystal thus provided with the resonator according to the present invention can be used for various optical devices.

For example, it can be used as a polarized light multiplexing multiplexer/demultiplexer for demultiplexing light by the difference of a polarized light plane and/or multiplexing light having a different polarized light plane. In this polarized light multiplexing multiplexer/demultiplexer, the first area is provided with a resonator which resonates with the TE-polarized light of a predetermined frequency, and the second area is provided with a resonator which resonates with the TM-polarized light of the same resonating frequency. The waveguide is formed to allow either (i) both the TE-polarized light and the TM-polarized light of the above-described frequency to pass through in the first area, and only the TM-polarized light of the above-described frequency to pass through in the second area, or (ii) both the TE-polarized light and the TM-polarized light of the above-described frequency to pass through in the second area, and only the TE-polarized light of the above-described frequency to pass through in the first area.

In the polarized light multiplexing multiplexer/demultiplexer thus constructed, the TE-polarized light is demultiplexed from the resonator of the first area and the TM-polarized light is demultiplexed from the resonator of the second area among the TE-polarized light and the TM-polarized light of the above-described frequency that are propagated through the waveguide. Similarly, the TE-polarized light of the above-described frequency is multiplexed from the resonator of the first region to the waveguide, and the TM-polarized light is multiplexed from the resonator of the second area to the waveguide. In this polarized light multiplexing multiplexer/demultiplexer, the TE-polarized light and the TM-polarized light having the same frequency can be independently used.

For extracting light from the resonators of the first area and/or the second area (in the case of an optical demultiplexer), or for introducing light into the resonators of the first area and/or the second area (in the case of an optical multiplexer), the two-dimensional photonic crystal according to the present invention may also be further provided with a second waveguide in addition to the above-described waveguide (called the "first waveguide" hereinafter). The second waveguide is formed to pass through either the first area or the second area, and to interpose a resonator disposed in the given area with the first waveguide. Therefore, light having a wavelength and polarization that resonate with the resonator can be extracted to the second waveguide in the given area. Similarly, the light having the wavelength and polarization that resonate with the resonator can be multiplexed from the second waveguide through the resonator to the first waveguide. The second waveguide may also be provided in the first area and the second area one by one.

The second waveguide may also be formed to pass through both the first area and the second area, and to be interposed the resonators with the first waveguide in the both areas. This two-dimensional photonic crystal can be used as a frequency (wavelength) multiplexer/demultiplexer of a polarized light non-dependent type for demultiplexing and multiplexing light of a predetermined frequency without depending of its polarized light.

The conventional two-dimensional photonic crystal frequency (wavelength) multiplexer/demultiplexer has been constructed to have a period structure, waveguide and resonator that are only applicable to either the TE-polarized light or the TM-polarized light, so that the other polarized light propagated through the waveguide is partially left as a loss without being demultiplexed. In contrast, the frequency (wavelength) multiplexer/demultiplexer of the polarized light non-dependent type has the second waveguide into which the TE-polarized light of a predetermined frequency is demultiplexed by the resonator of the first area and the TM-polarized light of the frequency is demultiplexed by the resonator of the second area, without having such a loss.

The first area and the second area function as one construction unit and a plurality of the construction units are connected so that a two-dimensional photonic crystal provided with the waveguides that are connected in the entire construction units can be formed. In this two-dimensional photonic crystal, an optical device in which independent use of the TE-polarized light and the TM-polarized light is allowed for a plurality of frequencies can be created by providing a resonator whose resonance frequency differs in every construction unit. Moreover, the TE-polarized light and the TM polarized light can be independently multiplexed/demultiplexed in the plurality of the frequencies and thereby it is possible to obtain an optical multiplexer/demultiplexer whose multiplexing number is twice as large as that of the case without distinguishing the polarized light.

Embodiments of the two-dimensional photonic crystal according to the present invention will be explained using FIGS. 3 to 1.

Figure 3:
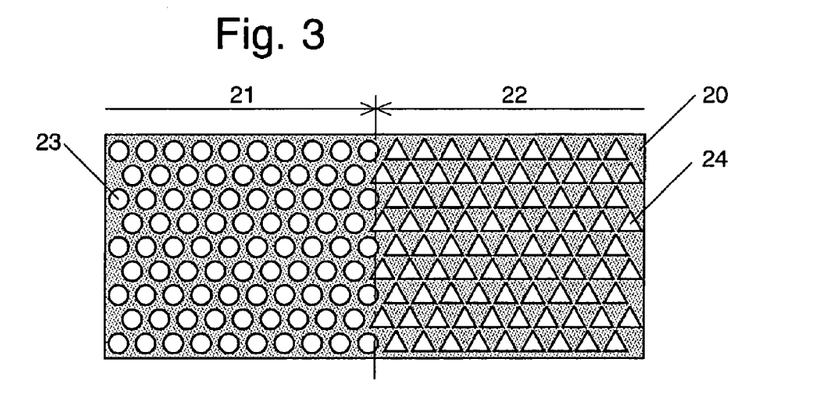
FIG. 3 is a plane view of an embodiment of the two-dimensional photonic crystal according to the present invention.

FIG. 3 shows an example of a basic structure of the two-dimensional photonic crystal according to the present invention. A body 20 is created in a planar state (slab state) using a material such as Si and InGaAsP whose refractive index is sufficiently higher than air. The body 20 includes a first area 21 and a second area 22. Circular holes 23 (modified refractive index areas) are arranged in the first area 21, and equilateral triangular holes 24 are arranged in the second area 22, each in a triangular lattice pattern. As will be described below, this construction allows the TE-PBG to be created in the first area and the TM-PBG to be created in the second area. Such a construction of connecting an area in which the TE-PBG is created to an area in which the TM-PBG is created is called the "polarized light hetero structure" hereinafter.

The result of calculating a photonic band for the two-dimensional photonic crystal of the present embodiment (FIG. 3) and the conventional two-dimensional photonic crystal as a comparative example (FIG. 4) will be described.

Figure 4:
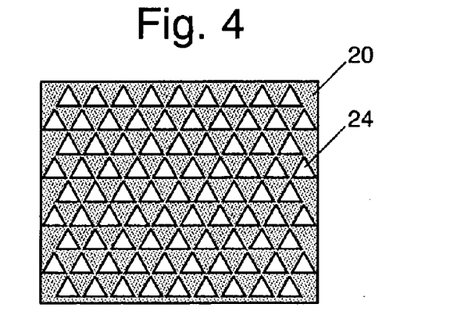
FIG. 4 is a plane view of a two-dimensional photonic crystal of a comparative example.

Explained first will be the two-dimensional photonic crystal as a comparative example. This two-dimensional photonic crystal has equilateral triangular holes arranged in a triangular lattice pattern, being constructed in the same manner with the second area of the present embodiment (FIG. 3). It is known that the TE-PBG and the TM-PBG are created in one two-dimensional photonic crystal in this construction (Patent Document 2).

Parameters used for the calculation will be explained. The present embodiment and the comparative example are calculated on condition that the period of the holes is a, the body thickness is 0.6 a, the radius of the circular holes in the first area of the present embodiment is 0.35 a, and the length of each side of the equilateral triangular holes in the second area and the comparative example is 0.95 a. The refractive index of the body is also assumed to be 3.4 as the refractive index of Si.

Figure 5:
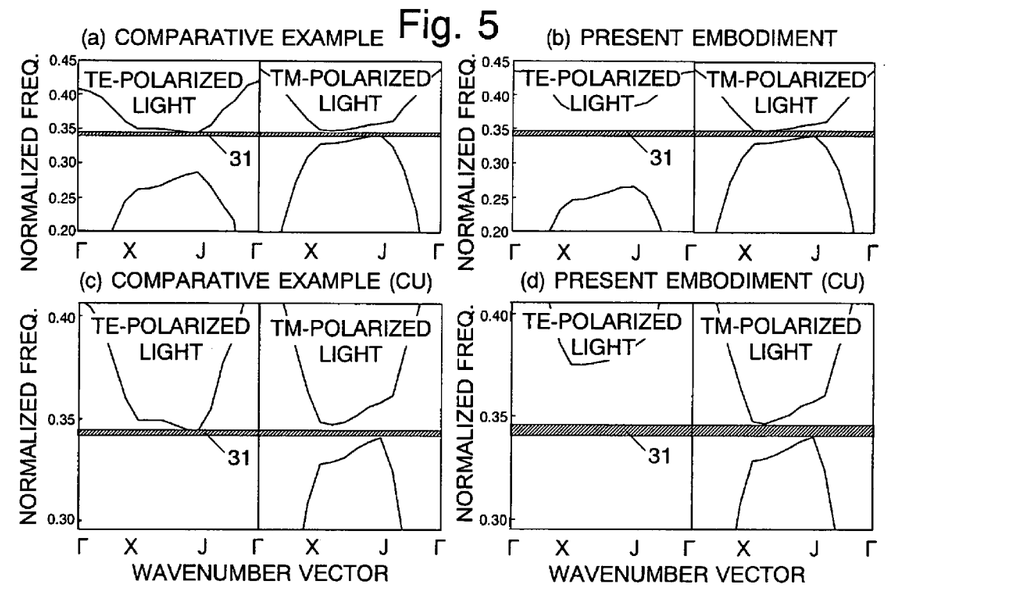
FIG. 5 is a set of photonic band diagrams of the two-dimensional photonic crystals of the comparative example and the present embodiment.

FIGS. 5a and 5c are a set of band views showing the two-dimensional photonic crystal of the comparative example, and FIGS. 5b and 5d are a set of band views showing the two-dimensional photonic crystal of the present embodiment. Here, FIGS. 5c and 5d are an enlarged view of FIG. 5a and FIG. 5b respectively. A band view with respect to the TE-polarized light and a band view with respect to the TM-polarized light are shown side by side in FIGS. 5a and 5c, while a band view with respect to the TE-polarized light in the first area and a band view with respect to the TM-polarized light in the second area are shown side by side in FIGS. 5b and 5d. The vertical axis is indicated by a normalized frequency in which a frequency is divided by c/a (c is a light speed). The present embodiment shows that an energy (frequency) region of the TM-PBG of the second area is entirely included in the TE-PBG of the first area, as opposed to the comparative example in which the TE-PBG and the TM-PBG are partially overlapped. Therefore, an absolute PBG 31 being an energy region in which the TE-PBG and the TM-PBG are overlapped is larger in the present embodiment than that of the comparative example. The PBG 31 can be thus increased and thereby versatility is enhanced in designing an optical multiplexer/demultiplexer.

The above-described parameters are determined in practice so that an entire area of the TM-PBG of the second area is turned into the absolute PBG 31. The parameters can be thus determined because the TE-PBG and the TM-PBG can be independently adjusted according to the present invention.

Figure 6:
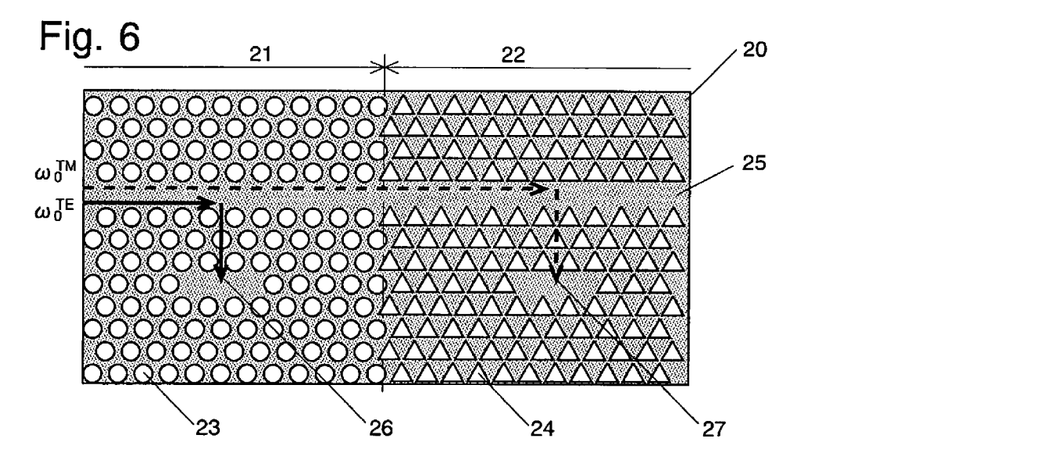
FIG. 6 is a plane view of the two-dimensional photonic crystal of the present embodiment in which a waveguide and a resonator are created.

FIG. 6 shows an embodiment of a two-dimensional photonic crystal of a polarized light hetero structure, in which the waveguide and the resonator are created. A linear defect which is a space of a linear shape omitting the period structure made by the holes 23 is created in the first area 21, and a linear defect is similarly created in the second area 22 so as to be connected to the linear defect of the first area 21. Therefore, a waveguide 25, which passes through both the first area 21 and the second area 22, is created. Within the first area 21, a point-like defect of three of the linearly arranged holes 23 is provided in a position disposed via three columns from the waveguide 25, so that a resonator 26 is created. A resonator 27 is similarly created within the second area 22.

Figure 7:
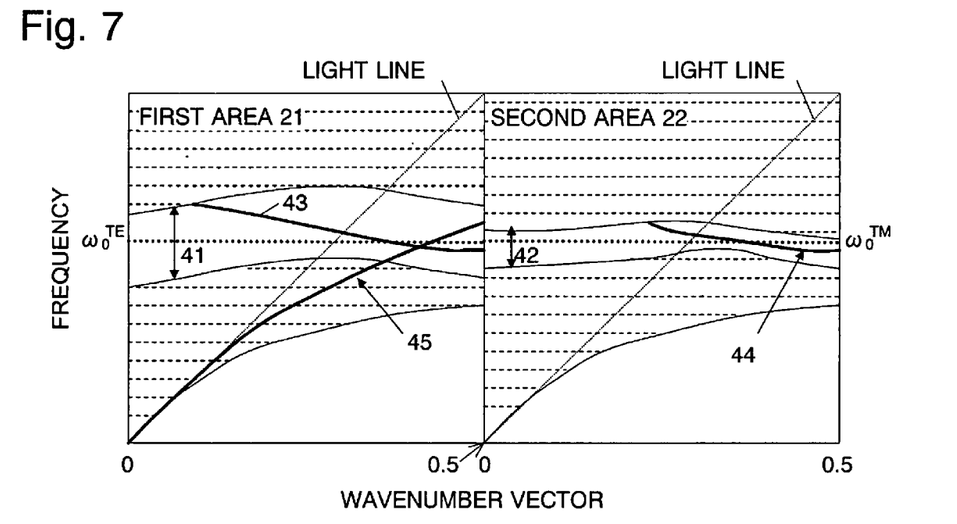
FIG. 7 is a photonic band diagram of the two-dimensional photonic crystal shown in FIG. 6.

The two-dimensional photonic crystal of the polarized light hetero structure shown in FIG. 6 will be explained using a set of band views of FIG. 7. A TE-PBG 41 is created in the first area 21 and a TM-PBG 42 is created in the second area 22. The waveguide 25 of the first area 21 has a passing frequency band TE-WG 43 of the TE-polarized light created within the TE-PBG 41, and the waveguide 25 of the second area 22 has a passing frequency band TM-WG 44 of the TM-polarized light created within the TM-PBG 42. The TE-WG 43 and the TM-WG 44 are both realized by a defect level created within the PBG. Meanwhile, a TM waveguide mode is obtained as a curve 45 shown in FIG. 7 in the waveguide 25 of the first area 21, while the TM-polarized light which was made incident is locked in the waveguide 25 by a refractive index difference among the body 20, the holes 23 and the outside, and allowed to be propagated therein. Therefore, light of a frequency $\omega_0$ can be propagated through the waveguides 25 of the first area 21 in the case of the TE-polarized light, and propagated through the waveguide 25 of both the first area 21 and the second area 22 in the case of the TM-polarized light. Parameters (shape, size, etc.) of the resonator 26 are set to obtain resonance to the TE-polarized light of the frequency $\omega_0$, and parameters of the resonator 27 is set to obtain resonance to the TM-polarized light of the frequency $\omega_0$. Therefore, the two-dimensional photonic crystal of the polarized light hetero structure is turned into a polarized light demultiplexer via the resonator 26 in order to demultiplex the TE-polarized light of the frequency $\omega_0$ from rays of light propagated within the waveguide 25, and a polarized light demultiplexer via the resonator 27 in order to demultiplex the TM-polarized light of the frequency $\omega_0$, so that the demultiplexed polarized light is sent to the outside of the crystal. Similarly, the two-dimensional photonic crystal is turned into a polarized light multiplexer via the resonator 26 in order to multiplex the TE-polarized light of the frequency $\omega_0$ from the outside of the crystal, and a polarized light multiplexer via the resonator 27 in order to multiplex the TM-polarized light of the frequency $\omega_0$ from the outside of the crystal, so that the multiplexed polarized light is sent to the waveguide 25.

Figure 8:
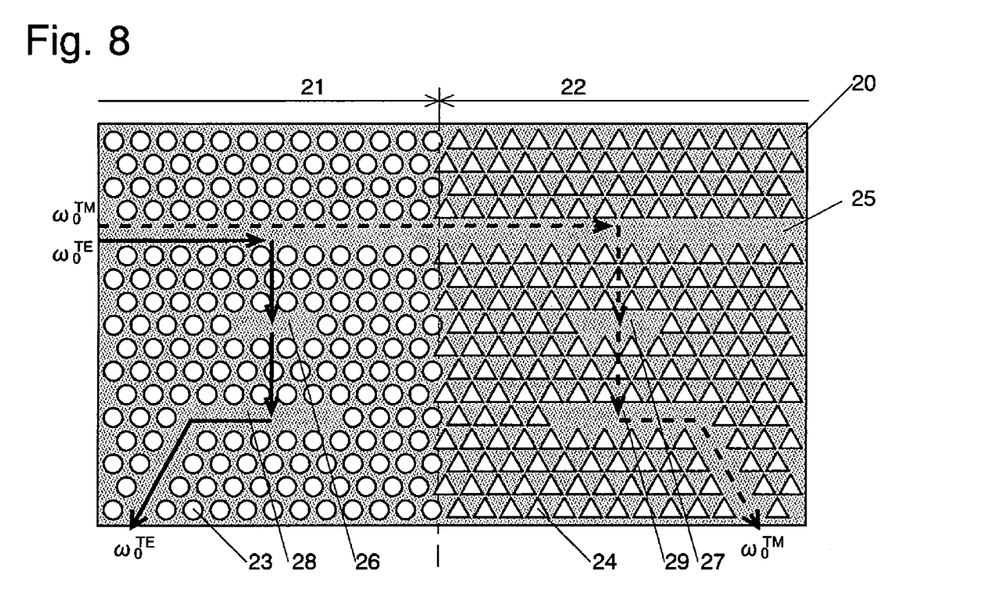
FIG. 8 is a plane view of a two-dimensional photonic crystal in which a waveguide is further created in the vicinity of each of the resonators.

FIG. 8 shows a two-dimensional photonic crystal in which the two-dimensional photonic crystal of the polarized light hetero structure is further provided with a waveguide 28 which passes in the vicinity of the resonator 26 in the first area 21, and a waveguide 29 which passes in the vicinity of the resonator 27 in the second area 22, respectively. The resonator 26 is created so as to be interposed between the waveguide 25 and the waveguide 28, and the resonator 27 is created so as to be interposed between the waveguide 25 and the waveguide 29, respectively. According to this construction, the TE-polarized light and the TM-polarized light of the frequency $\omega_0$ are demultiplexed from the waveguide 25 to the waveguide 28 and the waveguide 29 respectively, and the TE-polarized light and the TM-polarized light of the frequency $\omega_0$ are multiplexed from the waveguide 28 and the waveguide 29 to the waveguide 25.

Figure 9:
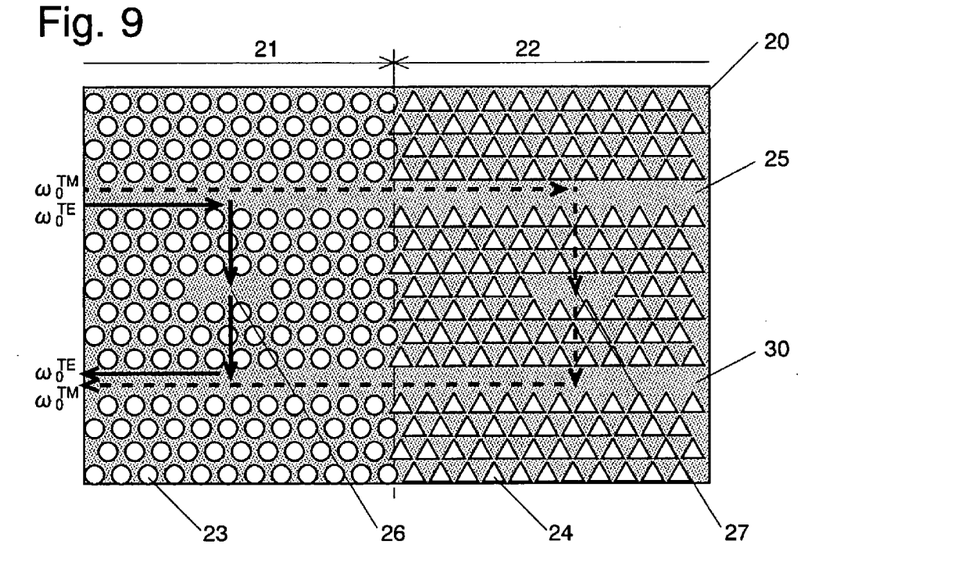
FIG. 9 is a plane view of a two-dimensional photonic crystal in which a waveguide passing through both the first area and the second area is further created.

FIG. 9 shows a two-dimensional photonic crystal in which the two-dimensional photonic crystal of the polarized light hetero structure is further provided with a waveguide 30 passing through both the first area 21 and the second area 22. The resonators 26 and 27 are both created so as to be interposed between the waveguide 25 and the waveguide 30. According to this construction, the TE-polarized light of the frequency $\omega_0$ selected from rays of light having various wavelengths and polarization and propagated through the waveguide 25, is demultiplexed to the waveguide 30 via the resonator 26, and the TM-polarized light of the frequency $\omega_0$ propagated through the waveguide 25 is similarly demultiplexed to the waveguide 30 via the resonator 27. Accordingly, light of the frequency $\omega_0$ propagated through the waveguide 25 can be demultiplexed to the waveguide 30 without depending on its polarized light. It functions as a multiplexer in the same manner.

Figure 10:
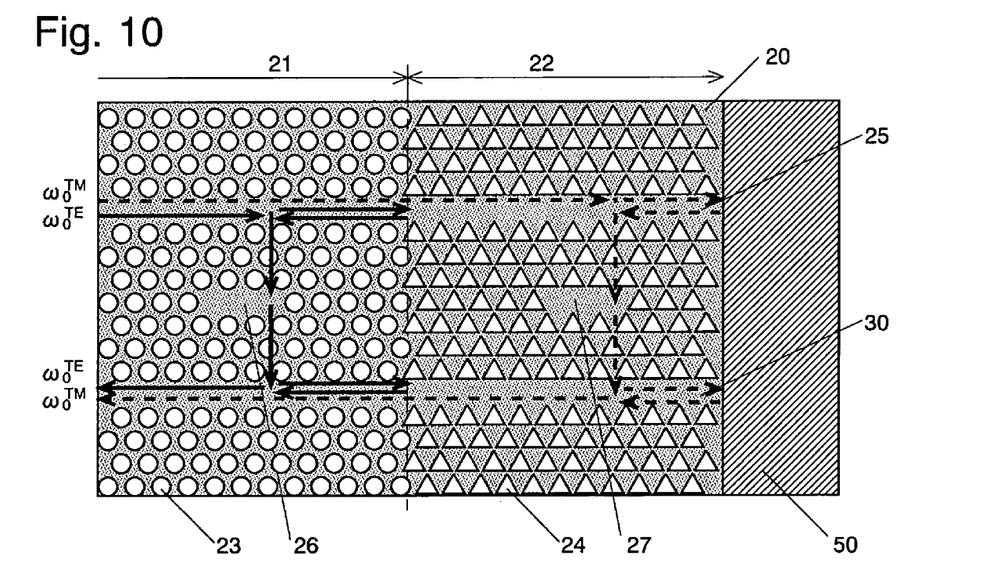
FIG. 10 is a plane view of a two-dimensional photonic crystal in which a reflection plane is created at a terminal portion of the second area.

According to the construction shown in FIG. 9, the TM-polarized light propagated through the waveguide 25 partially passes through the resonator 27. Therefore, as shown in FIG. 10, it is desirable to provide a reflector 50 which reflects light propagated through the waveguide 25 at a terminal portion of the second area 22 in an opposite side of the first area 21. Accordingly, light passing through the resonator 27 is reflected by the reflector 50, which increases a probability that light will be introduced into the resonator 27 and enhances demultiplexing efficiency. This reflection plane can be created by connecting a two-dimensional photonic crystal in which polarization and frequency of light propagated through the waveguide 25 are included in the PBG for example, to the terminal portion.

Figure 11:
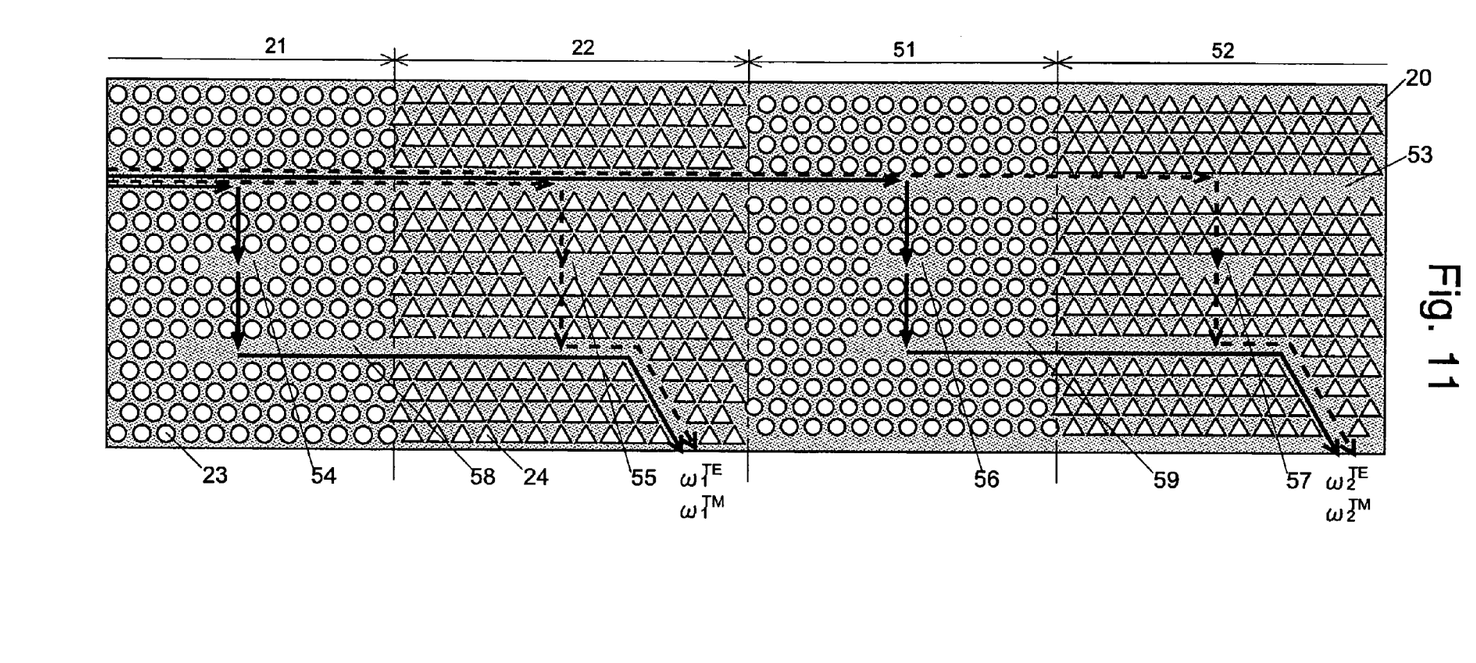
FIG. 11 is a plane view of a two-dimensional photonic crystal having a structure of connecting two pairs of two-dimensional photonic crystals of a polarized light hetero structure in a similar shape.

FIG. 11 shows a two-dimensional photonic crystal of a polarized light hetero structure in which a third area 51 and a fourth area 52 having a shape similar to the first area 21 and the second area 22 are connected to a terminal portion of the second area 22 in an opposite side of the first area 21. Each of the third area 51 and the fourth area 52 is obtained by reducing the first area 21 and the second area 22 in the same ratio. A waveguide 53 is formed from the first area 21 toward the fourth area 52, and resonators 54, 55, 56 and 57 are created in each of the areas separated from the waveguide 53 via three columns of holes. A waveguide 58 which passes through only the first area 21 and the second area 22 is also created so that the resonator 54 and the resonator 55 are held between the waveguide 53 and the waveguide 58. Similarly, a waveguide 59 which passes through only the third area 51 and the fourth area 52 is created so that the resonator 56 and the resonator 57 are interposed between the waveguide 53 and the waveguide 59. In this two-dimensional photonic crystal, the TE-polarized light resonates in the resonator 54 and the resonator 56 and the TM-polarized light resonates in the resonator 55 and the resonator 57 with respect to frequencies $\omega_1$ and $\omega_2$ that are different from each other. Therefore, it is possible to demultiplex light of the frequency $\omega_1$ from the first area 21 and the second area 22 to the waveguide 58 without depending on polarized light, and demultiplex light of the frequency $\omega_2$ from the third area 51 and the fourth area 52 to the waveguide 59 without depending on polarized light. Multiplexing is also performed in the same manner. Furthermore, three or more pairs of the two-dimensional photonic crystals of the polarized light hetero structure in the similar shape may also be connected.

The invention claimed is:

1. A two-dimensional photonic crystal having a periodic arrangement of refractive index distribution in a slab-shaped body, comprising:
   a) a first area having a photonic band gap for TE-polarized light; and
   b) a second area provided adjacent to the first area and having a photonic band gap for TM-polarized light, in which at least a part of an energy region is common to the photonic band gap of the TE-polarized light,
   wherein a waveguide passing through both the first area and the second area is provided for conducting light having energy within the part of the common energy region, the waveguide being defects created linearly in the first area connected to defects created linearly in the second area, and passing continuously through both the first and second areas, and
   a resonator is provided in the vicinity of the waveguides of the first area and the second area respectively, where the resonator resonates with the polarized light corresponding to the area.

2. The two-dimensional photonic crystal according to claim 1, wherein a second waveguide passing through either the first area or the second area and interposing the resonator of the given area with the waveguide is formed.

3. The two-dimensional photonic crystal according to claim 1, wherein a second waveguide passing through both of the first area and the second area and interposing the resonators of the both areas with the waveguide is formed.

4. A two-dimensional photonic crystal wherein the two-dimensional photonic crystal according to claim 1 functions as a single construction unit; a plurality of the construction units are connected; and waveguides in the entire construction units are connected continuously.

5. The two-dimensional photonic crystal according to claim 1, wherein the body thickness is consistent in the entire areas.

6. An optical function element using the two-dimensional photonic crystal according to claim 1.

7. The two-dimensional photonic crystal according to claim 1, wherein the refractive index distribution of the first area has a triangular lattice pattern arrangement of modified refractive index areas of a circular shape, and the refractive index distribution of the second area has a triangular lattice pattern arrangement of modified refractive index areas of an equilateral triangular shape.

* * * * *